US005748751A

United States Patent [19]
Janse et al.

[11] Patent Number: 5,748,751

[45] Date of Patent: May 5, 1998

[54] SIGNAL AMPLIFIER SYSTEM WITH IMPROVED ECHO CANCELLATION

[75] Inventors: Cornelis P. Janse; Patrick A. A. Timmermans, both of Eindhoven, Netherlands

[73] Assignee: U.S. Philips Corporation, New York, N.Y.

[21] Appl. No.: 822,958

[22] Filed: Mar. 21, 1997

Related U.S. Application Data

[63] Continuation of Ser. No. 728,574, Oct. 10, 1996, which is a continuation of Ser. No. 416,277, Apr. 4, 1995, abandoned.

[30] Foreign Application Priority Data

Apr. 12, 1994 [EP] European Pat. Off. .............. 94200984

[51] Int. Cl.[6] .............................................. H04B 15/00

[52] U.S. Cl. .............................. 381/93; 381/83; 381/66; 381/94.1

[58] Field of Search .............................. 381/93, 83, 94.1, 381/94.9, 66

[56] References Cited

U.S. PATENT DOCUMENTS

| | | | |
|---|---|---|---|
| 4,039,753 | 8/1977 | Balogh et al. . | |
| 4,449,237 | 5/1984 | Stepp et al. | 381/93 |
| 4,903,247 | 2/1990 | Van Gerwen et al. . | |
| 4,905,290 | 2/1990 | Yaoita | 381/93 |
| 5,091,952 | 2/1992 | Williamson | 381/93 |
| 5,259,033 | 11/1993 | Goodings et al. | 381/68 |
| 5,402,496 | 3/1995 | Soli | 381/94 |

FOREIGN PATENT DOCUMENTS

| | | | |
|---|---|---|---|
| 0581261 | 2/1994 | European Pat. Off. . | |
| 0585976 | 3/1994 | European Pat. Off. . | |
| 0197025 | 10/1985 | Japan | 381/93 |
| 0135100 | 6/1988 | Japan | 381/83 |

*Primary Examiner*—Minsun Oh Harvey
*Attorney, Agent, or Firm*—Arthur G. Schaier

[57] ABSTRACT

In a signal amplifier system, a microphone (2) is connected to an echo canceller (16) via a decorrelator (6). The output signal of the echo canceller (16) is amplified by an amplifier (14) and fed to a loudspeaker (18). The echo canceller (16) is included to avoid instability caused by undesired feedback of the signal coming from the loudspeaker (18) through a feedback path (11). To improve the stabilizing effect of the echo canceller (16), the decorrelator (6) is included for decorrelating the signal coming from the microphone (2) and the signal transmitted by the loudspeaker (18).

10 Claims, 2 Drawing Sheets

SIGNAL AMPLIFIER SYSTEM WITH IMPROVED ECHO CANCELLATION

This is a continuation of application Ser. No. 08/728,574, filed Oct. 10, 1996, which is a continuation of application Ser. No. 08/416,277, filed Apr. 4, 1995.

BACKGROUND OF THE INVENTION

The invention relates to a signal amplifier system comprising a pick-up element, a playback element and a signal processing system for deriving an output signal for the playback element from an input signal coming from the pick-up element, the signal processing system comprising an echo canceller which includes an adaptive filter for deriving a compensation signal from a signal that represents the output signal, subtracter means for determining a difference signal from the compensation signal and a signal that represents the input signal, and means for deriving the output signal from the difference signal.

The invention likewise relates to a signal processing system to be used in such a signal amplifier system.

A signal amplifier system as defined in the opening paragraph is known from U.S. Pat. No. 5,091,952.

Signal amplifier systems are used, for example, in conferencing systems, sound amplifying systems in halls or in the open air and in hearing aids. In these systems a signal generated by a pick-up element such as, for example, a microphone or an electric guitar, is amplified to a desired level by an amplifier. The signal thus amplified is then fed to a playback element such as, for example, a loudspeaker.

In these systems a signal generated by the playback element ends up either attenuated or not in the pick-up element. The result is a feedback system which may become unstable under certain circumstances. If the loop gain for a certain frequency becomes greater than or equal to one, the system will start to oscillate at this frequency. In audio systems this phenomenon of oscillation is called acoustic feedback.

In order to avoid this undesired oscillation, one may try to reduce as much as possible the link between the playback element and the pick-up element. In practice, the possibilities for doing this are often limited. Alternatively, it is possible to reduce the gain factor of the amplifier between pick-up element and playback element, but this may lead to the desired signal level not being attained.

In the signal amplifier system known from said United States Patent, an adaptive filter is used which tries to imitate the (undesired) transmission path between playback element and pick-up element. By feeding a signal representing the playback element output signal to this adaptive filter, a compensation signal may be obtained which is substantially equal to the signal the pick-up element receives from the playback element. By having the subtracter subtract the compensation signal from the signal that represents the input signal, the undesired feedback is eliminated.

It appears that the use of an echo canceller does produce considerable reduction of the influence of the undesired feedback path, but that this reduction is inadequate under specific circumstances.

SUMMARY OF THE INVENTION

It is an object of the invention to provide a signal amplifier system as defined in the opening paragraph, in which the effect of the undesired feedback path is further reduced.

For this purpose, the invention is characterized in that the signal amplifier system comprises decorrelation means for reducing the correlation between the input signal and the output signal.

By reducing the correlation between the input signal and the output signal by the decorrelation means, the loop gain formed by the signal amplifier system and the undesired feedback path is more or less disturbed. As a result, the undesired effect of the feedback path is suppressed better than in a state-of-the-art signal amplifier system.

An embodiment of the invention is characterized in that the decorrelation means are arranged for reducing the correlation between the difference signal and the output signal.

The adaptive filter adapts its transfer function in response to the difference signal and the most recent values of the signal that represents the output signal. The adaptive filter attempts to reduce the correlation between the difference signal and the most recent values of the output signal to zero. Without special measures, the adaptive filter is capable of achieving this effect by converting the input signal into an output signal that has a white frequency spectrum. For that matter, the autocorrelation function of a signal having a white frequency spectrum is only unequal to zero for a zero delay period. This leads to an undesired filtering of the input signal.

By reducing the correlation between the difference signal and the output signal, the adaptive filter can render the correlation between the difference signal and the most recent values of the output signal only equal to zero by rendering its transfer substantially equal to the transfer of the undesired feedback path.

A further embodiment of the invention is characterized in that the adaptive filter comprises a transform-domain adaptive filter.

The use of transform-domain adaptive filters leads to considerably improved convergence properties for the customary strongly correlated signals. Transform-domain adaptive filters are meant to be understood as filters in which the signal is first subjected to a signal transformation prior to the filtering operation. Examples of these transformations are the discrete Fourier transform, the discrete cosine transform and the discrete Walsh Hadamard transform.

A further embodiment of the invention is characterized in that the adaptive filter comprises a time-domain filter for deriving the compensation signal from a signal that represents the input signal of the playback element, and in that the transform-domain adaptive filter is arranged for determining filter parameters for the time-domain filter.

By utilizing a combination of a time-domain filter and a transform-domain filter, the advantageous convergence properties of transform-domain filters are combined with the short delay of a time-domain filter. A short delay is desirable in the present systems, because otherwise a speaker may happen to hear his own speech delayed over a certain period of time. This phenomenon is experienced as highly annoying especially in the case of long delays.

BRIEF DESCRIPTION OF THE DRAWING

The invention will now be further explained with reference to the drawing Figures in which like reference characters denote like elements, in which.

DESCRIPTION OF THE PREFERRED EMBODIMENTS

Figure 1:
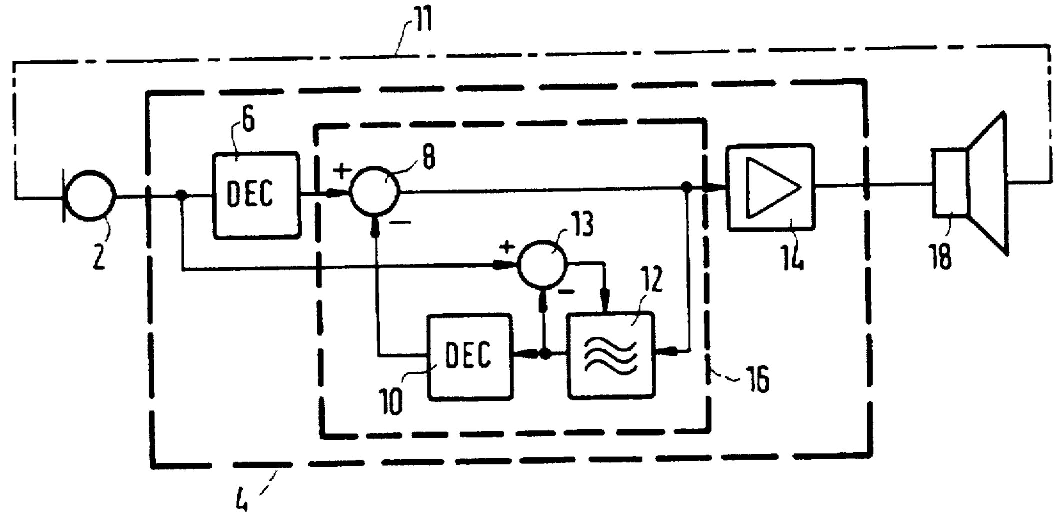
FIG. 1 shows a first embodiment of a signal amplifier system according to the invention.

In the signal amplifier system shown in FIG. 1, an output of the pick-up element, in this case a microphone 2, is connected to an input of the signal processing system 4. The input of the signal processing system, receiving the input signal from the pick-up element, is connected to an input of decorrelation means 6 and to a first input of a subtracter circuit 13. The output of the decorrelation means 6 carrying for its output signal the signal that represents the input signal, is connected to an input of the echocanceller 16.

Inside the echo canceller 16 this input is connected to a first input of the subtracter means, in this case formed by a subtracter circuit 8. The output of the subtracter circuit 8 is connected to the output of the echo canceller 16 and to a signal input of the adaptive filter 12. An output of the adaptive filter 12 is connected to an input of further decorrelation means 10 and to a second input of the subtracter circuit 13. The output of the subtracter circuit 13 is connected to a residual signal input of the adaptive filter 12. The output of the further decorrelation means 10 is connected to a second input of the subtracter circuit 8.

The output of the echo canceller is connected to an input of a power amplifier 14 whose output is connected to an input of the playback element, in this case formed by a loudspeaker 18. The (undesired) feedback path 11 is denoted in a dash-and-dot line.

In the signal amplifier system shown in FIG. 1 the signal generated by the microphone is decorrelated by decorrelator 6, so that the cross-correlation function of the input signal and the output signal of the decorrelator 6 is reduced. The decorrelator 6 is generally a time-variant system which, in addition, may be non-linear.

A first embodiment for the decorrelator is a time-variant phase modulator controlled by a sinusoidal auxiliary signal. Such a phase modulator is described in the journal article "Reverberation Control by Direct Feedback" by R. W. Guelke et al. in Acustica, Vol. 24, 1971, pp. 33–41, FIG. 13. For an input signal equal to sin(ωt) the following holds for the output signal F(t) of the decorrelation means 6:

$$F(t)=\sin[\omega t+k\cdot\sin(\omega_m t)] \tag{1}$$

In (1) k is a constant and $\omega_m$ is the angular frequency of the auxiliary signal. (1) may be developed into a series of first-type Bessel functions, so that F(t) can also be written as:

$$F(t)=J_0(k)\cdot\sin(\omega t)+J_1(k)\cdot[\sin(\omega+\omega_m)t-\sin(\omega+_m)t]+J_2(k)\cdot[\sin(\omega+2\omega_m)t+\sin(\omega-2\omega_m)]+ \tag{2}$$

For the cross-correlation function of the input signal and the output signal of the decorrelation means 6 there may be written:

$$cc(\tau)=E[\sin(\omega t)\cdot F(t-\tau)] \tag{3}$$

Substitution of (2) in (3), with an omission of terms that do not contribute to the value of the cross-correlation function cc(τ), results in:

$$cc(\tau)=\tfrac{1}{2}J_0[k]\cdot\cos(\omega\tau) \tag{4}$$

A suitable value for k is 2.4, because for this value $J_0$ is equal to zero. If $\omega_m$ is selected to be sufficiently low, for example, 1 Hz, this phase modulation is imperceptible. For random signals this phase modulation also provides complete decorrelation of the input signal, because a random signal may be considered a signal consisting of a large number of uncorrelated frequency components.

If a $\Delta_f$ frequency shift is utilized in the case of a sinusoidal input signal, the cross-correlation function cc(τ) of the input signal and the output signal of the decorrelation means 6 is always equal to zero, because two sinusoidal signals having different frequencies have a zero cross-correlation function. Because a random signal may be considered a sum of a large number of uncorrelated sinusoidal signals, the decorrelation for such signals is ideal too. The frequency shift may be realised by a single sideband modulator of which an embodiment will be further explained.

Furthermore, it is possible to arrange the decorrelation means as a delay element whose delay is varied by means of a control signal. This control signal may comprise, for example, a random signal, or a low-frequency sinusoidal signal.

In response to the output signal of the subtracter circuit 13 the adaptive filter 12 will adopt a transfer function equal to the transfer function of the undesired feedback path. As the adaptive filter 12 is incapable of imitating the transfer of the decorrelation means 6, further decorrelation means 12 equal to decorrelation means 6 are inserted between the output of the adaptive filter 12 and the second input of the subtracter circuit 8. The adaptive filter 12 may be a transversal filter whose tapping coefficients are determined in response to the output signal of the subtracter circuit 13 and the unweighted output signal of a certain tap according to the so-termed LMS algorithm. This algorithm is of common knowledge and will not be further explained here. It is noted that substantially all known algorithms can be used for the adaptation of adaptive filters.

The output signal of the echo canceller 16 is amplified to the desired level by the amplifier 14 and fed to the loudspeaker 18. The combination of the decorrelation means and the echo canceller makes it possible to select a higher gain factor than is possible in a state-of-the-art signal amplifier system.

Figure 2:
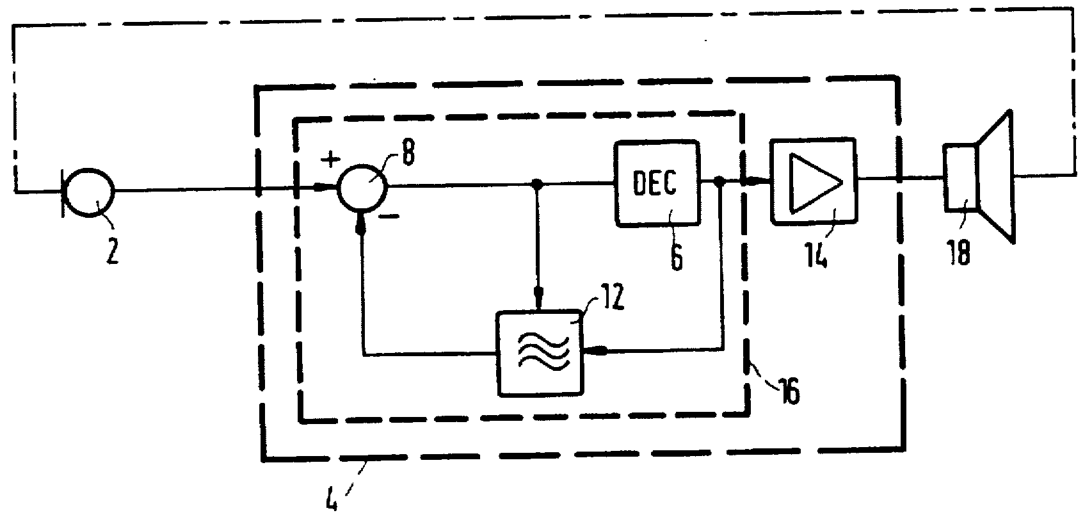
FIG. 2 shows a second embodiment for a signal amplifier system according to the invention.

In the signal amplifier system shown in FIG. 2 an output of the pick-up element, which element is in this case formed by a microphone 2, is connected to an input of the signal processing system 4. The input of the signal processing system receiving the input signal from the pick-up element is connected to an input of the echo canceller 16.

In the echo canceller 16 this input is connected to a first input of the subtracter means, in this case formed by a subtracter circuit 8. The output of the subtracter circuit 8 is connected to an input of the decorrelation means 6 and to a residual signal input of the adaptive filter 12. The output of the decorrelation means 6 is connected to the output of the echo canceller 16 and to a signal input of the adaptive filter 12. An output of the adaptive filter 12 is connected to a second input of the subtracter circuit 8.

The output of the echo canceller is connected to an input of a power amplifier 14 whose output is connected to an input of the playback element, in this case formed by a loudspeaker 18. The (undesired) feedback path 11 is denoted by a dash-and-dot line.

The signal amplifier system shown in FIG. 2 differs from the signal amplifier system shown in FIG. 1 by the location of the decorrelation means 6. In the signal amplifier system shown in FIG. 2 the decorrelation means 6 are inserted between the subtracter circuit 8 and the output of the echo canceller 16.

This measure provides that for the echo canceller 16 the error signal is no longer correlated with the signal that represents the output signal for the loudspeaker 18. As a result, there is avoided that the adaptive filter 12 is set such that the output signal of the echo canceller becomes substantially white. For that matter, without the decorrelator 6 between the output of the subtracter circuit 8 and the output of the echo canceller 16, the adaptive filter 12 will try and reduce to zero the correlation between the error signal and the values of the output signal of the echo canceller 16 from the past (still stored in the adaptive filter 12). The adaptive filter can effect this by rendering the autocorrelation function of the echo canceller output signal equal to zero for non-zero delays. This means that the output signal of the echo canceller would become substantially white, so that there would be an undesired filtering of the input signal of the echo canceller.

The insertion of the decorrelator 6 between the output of the subtracter circuit 8 and the output of the echo canceller achieves that the correlation between the error signal and the values of the output signal of the echo canceller 16 from the past can become zero only if the transfer function of the adaptive filter 12 substantially corresponds to the transfer by the undesired feedback path.

The improvement achieved by the combination of the decorrelation means 6 and the adaptive filter 12 is greater than the total of improvements achieved when the decorrelator 6 and the adaptive filter 12 are used separately. The decorrelator not only provides a decorrelation of the error signal and the input signal of the adaptive filter 12, but also maintains the system stable, so that the adaptive filter 12 has the possibility of converging. The adaptive filter 12 also leads to an improvement of the performance of the decorrelation means 6. The improvement of the stability margin by the decorrelation means 6 is enhanced as the transfer function of the feedback path shows a larger discrepancy between mean value and peak value. In systems in which there is a considerable direct coupling between loudspeaker 18 and microphone 2, there is only a minor difference between the mean value and the peak value of the transfer function. Since the adaptive filter 12 imitates the first part of the impulse response of the feedback path, which impulse response is mainly determined by the direct coupling, the difference between peak value and mean value of the transfer function is increased. As a result, the decorrelator 6 enhances the improvement of the stability margin.

Figure 3:
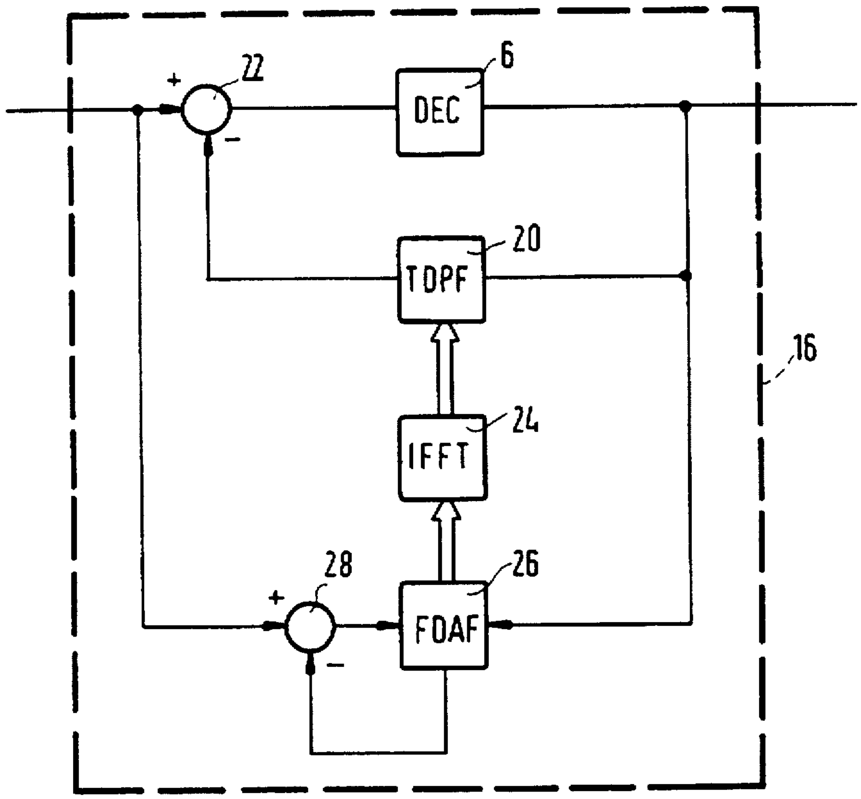
FIG. 3 shows an embodiment for the echo canceller 16 to be used in a signal amplifier system shown in FIG. 1 or FIG. 2.

In the embodiment for the echo canceller 16 shown in FIG. 3 the input signal of this echo canceller 16 is fed to a first input of the subtracter means, in this case formed by a subtracter circuit 22, and to a first input of a subtracter circuit 28. The output of the subtracter circuit 22 is connected to an input of decorrelation means 6. The output of the decorrelation means 6 is connected to the output of the echo canceller 16, to an input of a time-domain programmable filter 20 and to an input of a transform-domain adaptive filter, in this case formed by a frequency-domain adaptive filter 26. An output of the time-domain programmable filter 20 is connected to a second input of the subtracter circuit 22.

An output of the frequency-domain adaptive filter 26 is connected to a second input of the subtracter circuit 28. An output of the subtracter circuit 28 is connected to a residual signal input of the frequency-domain adaptive filter 26. A further output of the frequency-domain adaptive filter 26, carrying the filter coefficients of the frequency-domain adaptive filter 26 for its output signals, is connected to an input of an IFFT circuit 24 (Inverse Fast Fourier Transformer). The output of the IFFT circuit 24, carrying the time-domain coefficients for the time-domain adaptive filter 20 for its output signals, is connected to an input of that adaptive filter 20.

In the echo canceller 16 shown in FIG. 3 the time-domain programmable filter 20 generates a replica of the feedback signal received via the undesired feedback path, and subtracted from the input signal of echo canceller 16 by the subtracter circuit 22. The coefficients of the time-domain programmable filter 20 are determined by the combination of the frequency-domain adaptive filter 26 and the IFFT circuit 24. In the frequency-domain adaptive filter 26 the transfer function of this filter 26 is determined in such a way that the correlation between the output signal of the subtracter circuit 28 and the output signal of the frequency-domain adaptive filter 26 is minimized. The filter coefficients determined by the frequency-domain adaptive filter 26 are converted by the IFFT circuit 24 into filter coefficients suitable for the time-domain programmable filter 20. The advantage of the use of a frequency-domain adaptive filter in lieu of a time-domain adaptive filter is that the convergence properties of a frequency-domain filter for strongly autocorrelated signals such as, for example, speech and music, are considerably better than those of a time-domain adaptive filter. The use of a time-domain programmable filter is advantageous in that the signal in a time-domain filter is subjected to a considerably shorter delay than in a frequency-domain filter. Further details of the combination of a time-domain programmable filter with a frequency-domain adaptive filter in an echo canceller is described in U.S. Pat. No. 4,903,247.

Figure 4:
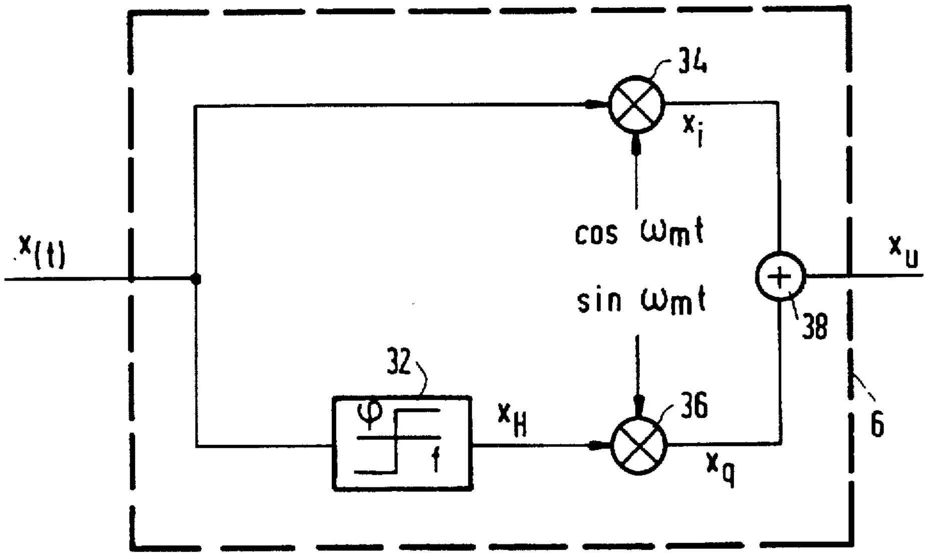
FIG. 4 shows an implementation of an embodiment for the decorrelation means 6 to be used in a signal amplifier system shown in FIG. 1 or FIG. 2.

The input signal of the decorrelator 6 shown in FIG. 4 is fed to an input of a multiplier circuit 34 and to an input of a Hilbert transformer 32. A second input of the multiplier circuit 34 is supplied with a signal that is equal to $\cos(\omega_m t)$. The output of the multiplier circuit 34 is connected to a first input of an adder circuit 38.

The output of the Hilbert transformer 32 is connected to a first input of a multiplier circuit 36. A second input of the multiplier circuit 36 is supplied with a signal equal to $\sin(\omega_m t)$. The output of the multiplier circuit 36 is connected to a second input of an adder circuit 38. The output of the adder circuit 38 also forms the output of the decorrelation means 6.

The decorrelation means 6 form a single-sideband modulator which produces an input signal frequency shift that corresponds to an angular frequency $\omega_m$.

If $X(\omega)$ can be written for the frequency spectrum of the input signal $x(t)$ of the decorrelation means 6, the following may be written for the frequency spectrum $X_H(\omega)$ of the output signal of the Hilbert transformer 32:

$$X_H(\omega) = X(\omega)e^{-j\frac{\pi}{2}\,\mathrm{sign}(\omega)} \tag{5}$$

In (5) $\mathrm{sign}(\omega)$ is the signum operator equal to +1 for $\omega>0$ and equal to −1 for $\omega<0$. For the output signal $x_i$ of the multiplier 34 then holds:

$$x_i = x(t)\frac{(e^{j\omega_m t} - e^{-j\omega_m t})}{2} \tag{6}$$

For the frequency spectrum of the signal $x_i$ then holds:

$$X_i(\omega) = \frac{X(\omega - \omega_m) + X(\omega + \omega_m)}{2} \tag{7}$$

For the signal $x_q(t)$ on the output of the multiplier circuit 36 holds:

$$x_q(t) = x_H(t)\cdot\frac{(e^{j\omega_m t} - e^{-j\omega_m t})}{2j} \tag{8}$$

For the frequency spectrum of the signal $x_q$ is found while utilizing (5) and (8):

$$X_q(\omega) = \begin{cases} \dfrac{X(\omega-\omega_m)-X(\omega+\omega_m)}{2} & ; \ \omega>0 \\ \dfrac{X(\omega+\omega_m)-X(\omega-\omega_m)}{2} & ; \ \omega<0 \end{cases} \quad (9)$$

For the output signal of the adder circuit 38 there is obtained:

$$X_u(\omega) = \begin{cases} X(\omega-\omega_m); & \omega>0 \\ X(\omega+\omega_m); & \omega<0 \end{cases} \quad (10)$$

From (10) it clearly appears that a signal $x_u$ is obtained whose frequency spectrum is shifted by $\omega_m$. In practice the Hilbert transformer 32 is frequently preceded by a high-pass filter to suppress undesired, very low-frequency signal components.

It is noted that the decorrelation means are described as a continuous-time system. It may occur that a discrete-time implementation of the decorrelation means is selected. This discrete-time implementation, however, can be simply derived from the continuous-time implementation given above.

We claim:

1. A signal amplifier system comprising a pick-up element, a playback element, and a signal processing system, including echo cancellation means, for deriving an output signal for the playback element from an input signal produced by the pick-up element, said signal processing system comprising:

a. an input for receiving the input signal produced by the pick-up element;

b. an output for providing the output signal to the playback element;

c. a signal path coupling the input to the output;

d. subtracter means having a first input and an output via which said subtractor means is electrically connected in the signal path, and further having a second input, said subtracter means producing the output signal in response to signals applied to said first and second inputs;

e. time-variant decorrelation means having an input and an output via which said decorrelation means is electrically connected in the signal path in series with the subtracter means, said decorrelation means substantially effecting decorrelation between the input signal and the output signal; and f. adaptive filter means having an input electrically connected to the signal path after the series-connected decorrelation and subtracter means for receiving the decorrelated output signal, and having an output for producing a compensation signal electrically connected to the second input of the subtracter means.

2. A signal amplifier system as in claim 1 where the decorrelation means is electrically connected in the signal path between the subtracter means and the output of said system.

3. A signal amplifier system as in claim 1 or 2 where the adaptive filter comprises a transform-domain filter.

4. A signal amplifier system as in claim 3 where the adaptive filter comprises a time-domain filter for deriving the compensation signal from the input signal produced by the pick-up element and where the transform-domain filter determines filter parameters for the time-domain filter.

5. A signal amplifier system as in claim 1 or 2 where the decorrelation means comprises frequency translation means.

6. A signal amplifier system as in claim 1 or 2 where the decorrelation means comprises phase modulation means.

7. A signal processing system, including echo cancellation means, for deriving an output signal for a playback element from an input signal produced by a pick-up element, said signal processing system comprising:

a. an input for receiving the input signal produced by the pick-up element;

b. an output for providing the output signal to the playback element;

c. a signal path coupling the input to the output;

d. subtracter means having a first input and an output via which said subtractor means is electrically connected in the signal path, and further having a second input, said subtracter means producing the output signal in response to signals applied to said first and second inputs;

e. time-variant decorrelation means having an input and an output via which said decorrelation means is electrically connected in the signal path in series with the subtracter means, said decorrelation means substantially effecting decorrelation between the input signal and the output signal; and f. adaptive filter means having an input electrically connected to the signal path after the series-connected decorrelation and subtracter means for receiving the decorrelated output signal, and having an output for producing a compensation signal electrically connected to the second input of the subtracter means.

8. A signal processing system as in claim 7 where the decorrelation means is electrically connected in the signal path between the subtracter means and the output of said system.

9. A signal processing system as in claim 7 or 8 where the adaptive filter comprises a transform-domain filter.

10. A signal processing system as in claim 9 where the adaptive filter comprises a time-domain filter for deriving the compensation signal from the input signal produced by the pick-up element and where the transform-domain filter determines filter parameters for the time-domain filter.

* * * * *